(12) United States Patent
Chen et al.

(10) Patent No.: US 12,707,497 B2
(45) Date of Patent: Aug. 11, 2026

(54) TECHNOLOGIES FOR LISTEN-BEFORE-TALK INDICATION IN HIGH-FREQUENCY NETWORKS

(71) Applicant: Apple Inc., Cupertino, CA (US)

(72) Inventors: Xiang Chen, Campbell, CA (US); Dawei Zhang, Saratoga, CA (US); Haitong Sun, Cupertino, CA (US); Hong He, San Jose, CA (US); Huaning Niu, San Jose, CA (US); Jie Cui, San Jose, CA (US); Manasa Raghavan, Sunnyvale, CA (US); Naveen Kumar R. Palle Venkata, San Diego, CA (US); Qiming Li, Beijing (CN); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 360 days.

(21) Appl. No.: 18/353,751

(22) Filed: Jul. 17, 2023

(65) Prior Publication Data

US 2024/0032095 A1 Jan. 25, 2024

Related U.S. Application Data

(60) Provisional application No. 63/391,683, filed on Jul. 22, 2022.

(51) Int. Cl.

*H04W 74/0808* (2024.01)
*H04W 24/08* (2009.01)
*H04W 24/10* (2009.01)
*H04W 48/12* (2009.01)
*H04W 48/14* (2009.01)
*H04W 72/542* (2023.01)
*H04W 74/00* (2009.01)
*H04W 74/08* (2024.01)

(52) U.S. Cl.

CPC ....... *H04W 74/0808* (2013.01); *H04W 48/14* (2013.01)

(58) Field of Classification Search

CPC . H04W 74/0808; H04W 48/14; H04W 48/12; H04W 72/542; H04W 24/08; H04W 24/10; H04W 74/002; H04W 74/0891

See application file for complete search history.

(56) References Cited

U.S. PATENT DOCUMENTS

2018/0098224 A1* 4/2018 Sun .................. H04W 72/0453
2021/0321314 A1* 10/2021 Ozturk ................. H04W 36/24
2022/0159709 A1* 5/2022 Xue .................... H04W 74/002
2024/0334334 A1* 10/2024 Guo .................... H04L 27/2602
2024/0340928 A1* 10/2024 Kim ................. H04W 36/0088
2025/0081234 A1* 3/2025 Fu ....................... H04W 74/006
2025/0280437 A1* 9/2025 Ganesan .............. H04W 16/14

OTHER PUBLICATIONS

LS on CCA configurations of neighbour cells, 3GPP TSG-RAN WG4 Meeting #103e, R4-2211171, May 23, 2022, 1 page.

(Continued)

*Primary Examiner* — Harry H Kim

(74) *Attorney, Agent, or Firm* — Kilpatrick Townsend & Stockton LLP

(57) ABSTRACT

The present application relates to devices and components including apparatus, systems, and methods for listen-before-talk indications in high-frequency networks.

16 Claims, 6 Drawing Sheets

(56) References Cited

OTHER PUBLICATIONS

3rd Generation Partnership Project; Technical Specification Group Radio Access Network; NR; Radio Resource Control (RRC) protocol specification (Release 17), 3GPP TS 38.331 V17.1.0, Jun. 2022, 1273 pages.
3rd Generation Partnership Project; Technical Specification Group Radio Access Network; Physical layer procedures for shared spectrum channel access (Release 17), 3GPP TS 37.213 V17.2.0, Jun. 2022, 39 pages.

* cited by examiner

Performing a measurement with respect to the neighbor cell based on whether the neighbor cell uses the LBT procedure
308

TECHNOLOGIES FOR LISTEN-BEFORE-TALK INDICATION IN HIGH-FREQUENCY NETWORKS

CROSS-REFERENCE TO RELATED APPLICATION

This application claims the benefit of U.S. Provisional Patent Application No. 63/391,683, filed on Jul. 22, 2022, which is herein incorporated by reference in its entirety for all purposes.

FIELD OF INVENTION

This disclosure relates to the field of wireless networks and, in particular, to technologies for listen-before talk indications in high-frequency networks.

BACKGROUND

Cellular networks may be deployed in frequency range 1 (FR1), from 410 Megahertz (MHz)-7125 MHz, or frequency range 2 (FR2), from 24.25 Gigahertz (GHz)-71.0 GHz. These cellular networks may use licensed or unlicensed access. Operations to facilitate mobility of user equipments (UEs) within such networks may be considered.

DETAILED DESCRIPTION

Figure 1:
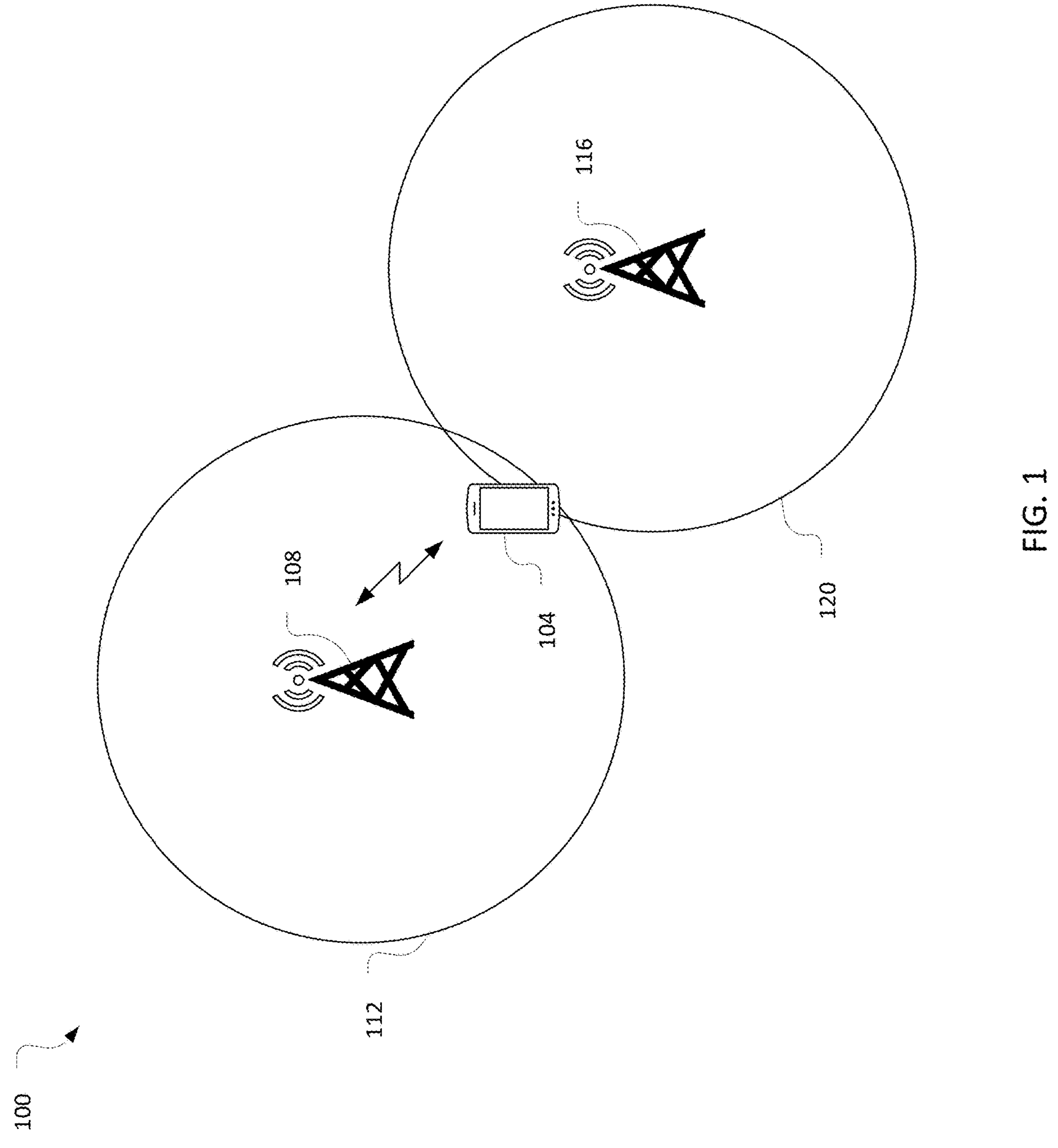
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B); and the phrase "based on A" means "based at least in part on A," for example, it could be "based solely on A" or it could be "based in part on A."

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, and network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or a virtualized network function.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a user equipment 104 and a base station 108. In some embodiments, the base station 108 may provide one or more wireless access cells, for example, serving cell 112, through which the UE 104 may communicate with a cellular network. The network environment 100 may further include base station 116 that provides one or more wireless access cells, for example, neighbor cell 120.

The UE 104 and the base stations 108/116 may communicate over air interfaces compatible with Long Term Evolution (LTE), Fifth Generation (5G) new radio (NR), (or later) system standards as provided by Third Generation Partnership Project (3GPP) technical specifications. If the base stations 108/116 are deployed in an LTE radio access network (RAN) they may also be referred to as eNBs 108/116. If the base stations 108/116 are deployed in a 5G RAN they may also be referred to as gNBs 108/116.

The UE 104 may include a radio resource control (RRC) state machine that performs operations related to a variety of RRC procedures including, for example, paging, RRC connection establishment, RRC connection reconfiguration, and RRC connection release. The RRC state machine may be implemented by protocol processing circuitry, see, for example, processing circuitry 504 of FIG. 5.

The RRC state machine may transition the UE 104 into one of a number of RRC states (or "modes") including, for example, a connected state (RRC connected), an inactive state (RRC inactive), and an idle state (RRC idle). The UE 104 may start in RRC idle when it first camps on a serving cell, which may be after the UE 104 is switched on or after a cell reselection from another cell. To engage in active communications, the RRC state machine may transition the UE 104 from RRC idle to RRC connected by performing an RRC setup procedure to establish a logical connection, for example, an RRC connection, with a base station. In RRC connected, the UE 104 may be configured with at least one signaling radio bearer (SRB) for signaling (for example, control messages) with the base station; and one or more data radio bearers (DRBs) for data transmission. When the UE 104 is less actively engaged in network communications, the RRC state machine may transition the UE 104 from RRC connected to RRC inactive using an RRC release procedure. The RRC inactive state may allow the UE 104 to reduce power consumption as compared to RRC connected, but will still allow the UE 104 to quickly transition back to RRC connected to transfer application data or signaling messages.

The cells provided by the base stations 108/116 may utilize a licensed medium (also referred to as "licensed spectrum" or "licensed band") or an unlicensed shared medium (also referred to as "unlicensed spectrum" or "unlicensed band"). To operate in the unlicensed spectrum, nodes (for example, UE 104, base station 108, or base station 116) may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) procedure. During an LBT procedure, a node may sense a medium (for example, a channel or carrier frequency) and transmit when the medium is sensed to be idle (or when a specific channel in the medium is sensed to be unoccupied). The medium sensing operation may include a clear channel assessment (CCA) that utilizes energy detection (ED) to determine the presence or absence of other signals on a channel in order to determine if a channel is occupied or clear. The ED may include sensing RF energy across an intended transmission band for a period of time and comparing the sensed RF energy to a predefined or configured threshold. The LBT procedure may allow cellular networks to coexist with other systems in the unlicensed spectrum.

The cells provided by the base stations 108/116 may be in FR1, FR2, or higher frequency ranges. In some embodiments one or more cells may be deployed in a spectrum from 52.6 GHz-71 GHz, which may be referred to as FR2-2. FR2-2 may include both licensed and unlicensed access. For the FR2-2 unlicensed band, for example, band 263, the LBT procedure may be mandatory in some geographical regions, but not others. Even if the LBT procedure is not mandated, it still may be used by a network.

During operation the UE 104 may periodically measure signals transmitted in the neighbor cell 120. These transmissions may include synchronization signal and physical broadcast channel (SSB) transmissions. These signal measurements, which may be performed in RRC idle, RRC inactive, or RRC connected states, may serve as a basis for radio resource management (RRM) procedures that support initial access and mobility functions. It may be beneficial for the UE 104 to know the LBT configuration of the cell on which it is performing measurements; as different requirements may be apply based on whether a cell uses an LBT procedure.

Embodiments disclosed herein describe provision and use of LBT information in a number of scenarios for regions in which LBT may not be in use. These scenarios may include the neighbor cell 120 having the same LBT configuration as the serving cell 112 and operating in the same frequency; the neighbor cell 120 having a different LBT configuration than the serving cell 112 and operating in the same frequency; the neighbor cell 120 having the same LBT configuration as the serving cell 112 and operating in a different frequency; the neighbor cell 120 having a different LBT configuration than the serving cell 112 and operating in a different frequency; and the serving cell 112 and the neighbor cell 120 being different radio-access technologies (for example, the serving cell 112 is an LTE serving cell and the neighbor cell 120 is an FR2-2 NR cell).

Options for signaling LBT information while the UE 104 is in the RRC connected state may be as follows. Various of these options may be used alone or in combination with other options.

In a first option, the serving cell 112 may use common signaling to inform the UE 104 of the LBT configuration of neighbor cells including, for example, neighbor cell 120. The common signaling may be system information transmitted in a system information block (SIB).

In a second option, the neighbor cell 120 may use common signaling to inform the UE 104 of its LBT configuration. Similar to the first option, the common signaling may be system information transmitted in a SIB. The second option may require the UE 104 to be capable of decoding the SIB with the LBT configuration information that is transmitted by the neighbor cell. To do so, the UE 104 may be configured with relevant information from the serving cell 112 or the UE 104 may acquire the information consistent with an initial cell search procedure. For example, the UE 104 may first obtain a master information block (MIB) after detecting an SSB transmitted by the base station 116. The UE 104 may determine the control resource set (CORESET) and search space of a physical downlink control channel (PDCCH) that allocates resources for a SIB 1 (SIB1), which may provide scheduling information for other SIBs. The LBT configuration may be in the SIB1 itself or one of the other SIBs.

In a third option, the serving cell 112 may use dedicated signaling to inform the UE 104 of the LBT configuration of neighbor cells including, for example, neighbor cell 120. In some instances, the dedicated signaling may be cell-specific signaling that is common for all UEs connected to the serving cell 112. In other instances, the dedicated signaling may be UE-specific signaling that is independently configured for each UE connected to the serving cell 112. This may provide the serving cell with the flexibility to configure the UE 104 with only the more relevant information. For example, if the UE 104 is traveling toward the neighbor base station 116, the UE 104 may only need to know the LBT configuration about the neighbor cell 120 and may not need to know an LBT configuration of a neighbor cell in the opposite direction. In some embodiments, dedicated signaling may include a combination of both cell-specific and UE-specific signaling.

In some instances, the UE 104 may initiate the communication of the LBT configuration by transmitting a request to the base station 108 for such information. The request may prompt a response with the LBT configuration. The response may be through common signaling or dedicated signaling as discussed above.

An example of a request-based option of providing the LBT configuration with common signaling includes the UE 104 transmitting the request as an on-demand SIB request. The on-demand SIB request may be sent as part of a random-access channel (RACH) procedure. For example, the on-demand SIB request may be included in a first message (MSG1) of a RACH procedure, which may also be referred to as a random access preamble, or a third message (MSG3) of a RACH procedure, which may also be referred to as a scheduled uplink transmission. Once the base station 108 receives the on-demand SIB request from the UE 104, the base station 108 may respond with the SIB that includes the LBT configuration of the neighbor cell 120.

An example of a request-based option of providing the LBT configuration with dedicated signaling includes the UE 104 transmitting the request via physical layer (PHY) signaling (for example, as a physical random access channel (PRACH) transmission), through a PHY channel (for example, as uplink control information (UCI)), as a media access control-control element (MAC-CE), or RRC signaling.

The base station 108 may use dedicated signaling to provide the LBT configuration to the UE 104 in one or more of the following manners.

In a first manner, the dedicated signaling may include an indication of the LBT configuration in a measurement object configuration information element (IE), for example, a measurement object (MeasObject) or measurement object NR (measObjectNR) used to specify information applicable for SSB or channel state information-reference signal (CSI-RS) intra-/inter-frequency measurements.

In a second manner, the dedicated signaling may include an indication of the LBT configuration in a serving cell configuration IE, for example, a serving cell configuration (ServingCellConfig) IE used to add or modify the UE 104 with a serving cell, a serving cell configuration common (ServingCellConfigCommon) IE used to configure cell-specific parameters of the serving cell, or a serving cell configuration SIB (ServingCellConfigCommonSIB) IE used to configure cell-specific parameters of the serving cell in SIB1.

In a third manner, the dedicated signaling may include an indication of the LBT configuration as part of an RRC connection setup. For example, the indication may be included in an RRC setup (RRCSetup) message, transmitted on SRB 0, used to establish SRB 1.

In a fourth manner, the dedicated signaling may include an indication of the LBT configuration as part of a handover message or cell-addition message to add, for example, a primary secondary cell group cell (PSCell). For example, the indication may be in an RRC reconfiguration (RRCReconfiguration) message used to modify an RRC connection.

In a fifth manner, the dedicated signaling may include an indication of the LBT configuration as part of an RRC resume (RRCResume) message used to resume a suspended RRC connection.

In some embodiments, the LBT configuration of neighbor cells may be provided to a group of UEs that are in RRC-connected state. In this manner, the same signaling may be used to simultaneously configure the group of UEs on whether the LBT is used for various neighbor cells. The serving base station 108 may determine the group of UEs based on a device type (for example, a fixed wireless access (FWA) type, a customer premise equipment (CPE) type, etc.), UE capability, etc. In some embodiments, the serving base station 108 may assign a radio network temporary identity (RNTI) to the group of UEs. The RNTI may then be used to signal the indication of the neighbor-cell LBT configuration. For example, the RNTI may be used to scramble cyclic-redundancy check (CRC) bits of a DCI transmission that includes the LBT indication or schedules a different transmission that includes the LBT indication.

The neighbor-cell LBT configuration may be provided, through common or dedicated signaling, with a variety of resolutions/granularities. In a first example, the resolution/granularity may be provided at a carrier frequency level. If the network environment 100 is structured in a manner in which the serving cell 112 is surrounded by neighbor cells in a plurality of carrier frequency levels (for example, carrier frequency 1 (F1) and carrier frequency 2 (F2)), the serving cell 112 may signal LBT configuration at the carrier frequency level. For example, F1: LBT/no LBT; and F2: LBT/no LBT. Upon receiving this information, the UE 104 may determine whether the neighbor cell 120 is operating at F1 or F2 and may determine its LBT configuration accordingly.

In a second example, the resolution/granularity may be provided at a physical cell identity (PCI) level. In this example, the LBT configurations may be provided for the PCIs present at each carrier frequency level. For example, the LBT configuration may indicate whether: PCI_1 of F1 is configured with LBT; PCI_2 of F1 is configured with LBT; PCI_1 of F2 is configured with LBT; and PCI_2 of F2 is configured with LBT. Upon receiving this information, the UE 104 may determine the PCI of the neighbor cell 120 and whether it is operating at F1 or F2 and may determine its LBT configuration accordingly.

Options for signaling LBT information while the UE 104 is in (or is transitioning to) the RRC idle or inactive state may be as follows. Various of these options may be used alone or in combination with other options.

In a first option, the serving cell 112 may indicate the neighbor-cell LBT configuration in one or more SIBs. If the serving cell 112 is an LTE cell, the SIB may be SIB24, for example. If the serving cell 112 is an NR cell, the SIB may be SIB3, SIB4, or SIB5, for example. Other SIBs may be used in other embodiments.

In a second option, the neighbor cell 120 may use common signaling to indicate its LBT configuration. The common signaling may be a SIB, which the UE 104 may be able to decode as part of a cell search procedure to acquire the relevant LBT configuration information.

In a third option, the serving cell 112 may use dedicated signaling to indicate the neighbor-cell LBT configuration. For example, the serving cell 112 may include the LBT configuration indication in a RRCRelease message that is transmitted to the UE 104, which causes the UE 104 to enter the RRC idle state. Provision of the LBT configuration indication in this embodiment may be done on a per-UE basis through, for example, a UE-dedicated configuration.

In a fourth option, the serving cell 112 may provide the LBT configuration indication to the UE 104 in conjunction with early measurement reporting (EMR). For example, the serving cell 112 may provide the UE 104 with an EMR configuration in an RRCRelease message that causes the UE 104 to transition to an RRC idle state. The serving cell 112 may also transmit a SIB that includes an indication of whether the serving cell 112 supports EMR. If the UE 104 has the EMR configuration it may perform measurements during an idle state. If a serving cell with which the UE 104 wishes to connect supports EMR (as indicated through a transmitted SIB), the UE 104 may provide the measurements to the serving cell 112 during a transition to the RRC connected state. In various embodiments, the serving cell 112 may provide the neighbor-cell LBT configuration along with the EMR configuration in the RRCRelease message or the SIB.

The neighbor-cell LBT configuration provided to the UE 104 when it is in (or transitioning to) the RRC idle or inactive state may have a resolution/granularity similar to that discussed above with respect to signaling while the UE 104 is in the RRC connected state. For example, the neighbor-cell LBT may be provided per carrier frequency level or per carrier frequency level and PCI.

In some embodiments, to simplify the signaling and potential UE processing, the LBT configuration of cells may be the same for a given carrier frequency level or PCI. For example, all cells operating in F1 may have the same LBT configuration and all cells operating in F2 may have the same LBT configuration.

The serving cell 112 may acquire the LBT configuration of the neighbor cell 120 in a number of ways. For example, in some instances the base station 108 and the base station 116 may have an inter-base station (BS) interface with one another that enables direct communication, which may be the case if they are both deployed by the same operator. If the base station 108 is an eNB and the base station 116 is a gNB, the inter-BS interface may be an X2 interface. If both the base station 108 and base station 116 are gNBs, the inter-BS interface may be an Xn interface. In this instance, the base station 108 may obtain the LBT configuration of the neighbor cell 120 from the base station 116 via the inter-BS interface.

In some instances, there may be no inter-BS interface between the serving cell 112 and the neighbor cell 120, which may be the case if the base stations are deployed by different operators. In this case, the serving cell 112 may use a UE-like receiver to decode common signaling transmitted by the neighbor cell 120 that provides the neighbor cell LBT configuration. The common signaling may be transmitted over an NR-Uu interface in this instance.

In some embodiments, if there is no inter-BS interface between the serving cell 112 and the neighbor cell 120, the serving cell 112 may trigger the UE 104 to perform a cell global identity (CGI) reading with LBT status acquisition on the neighbor cell 120. This may be similar to a self-organizing network (SON) function that automatically diagnoses and configures a network to improve operation. The serving cell 112 may configure the UE 104 (and potentially other UEs as well) to acquire the CGI and LBT configuration of the neighbor cell 120 (in a manner similar to that discussed elsewhere herein) and report the information to the serving cell 112. Neighbor-cell measurements may also be acquired/reported. The serving cell 112 may store the CGI/LBT configuration of the neighbor cell 120 in a neighbor cell relation list in its database for later provision to other UEs. The database may be an adaptive neighbor cell relation (ANR) database in some embodiments.

Figure 2:
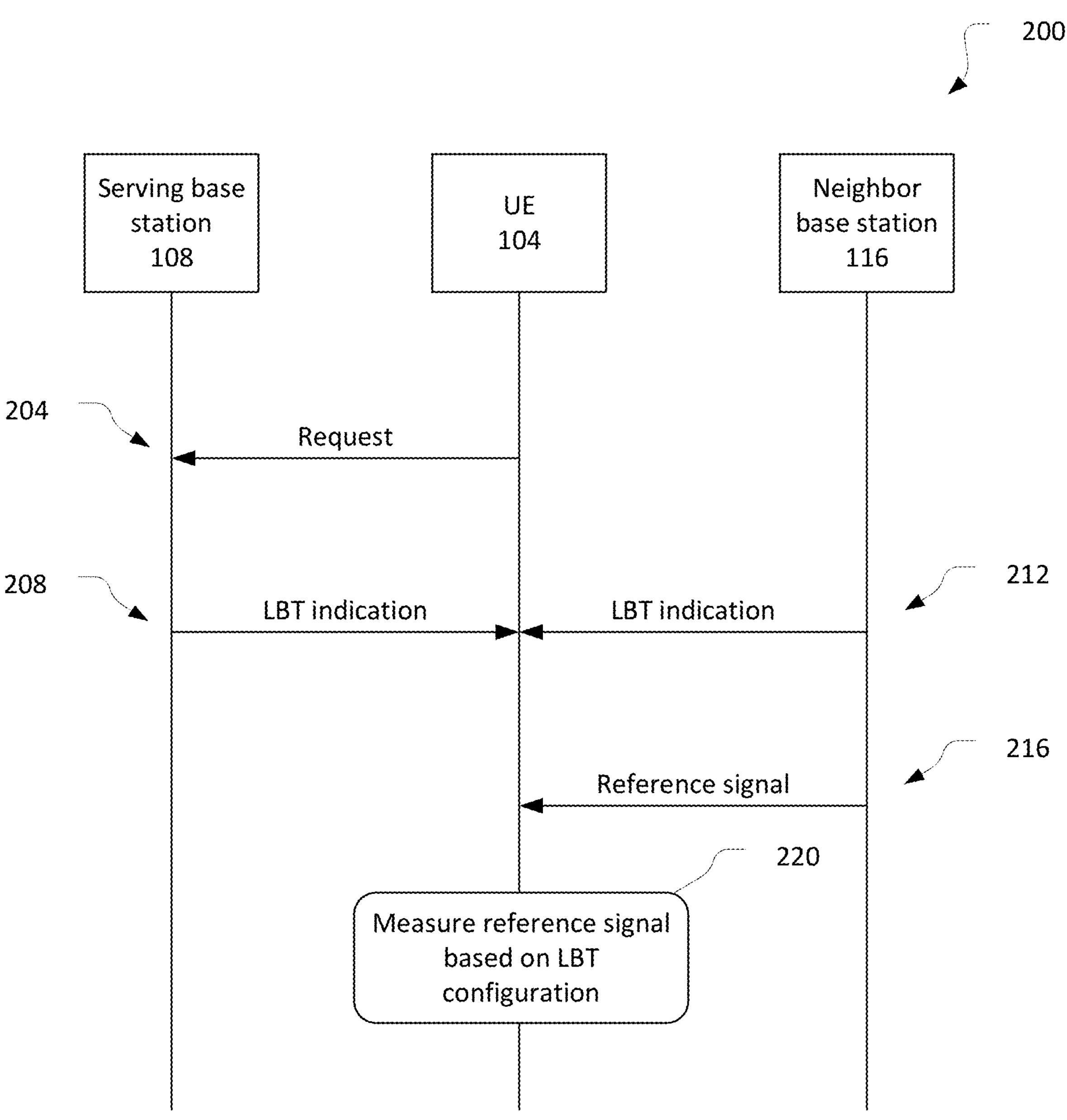
FIG. 2 illustrates a signaling diagram in accordance with some embodiments.

FIG. 2 illustrates a signaling diagram 200 in accordance with some embodiments. The signaling diagram 200 shows messages and operations performed by the UE 104, the serving base station 108, and the neighbor base station 116.

The UE 104 may transmit a request message 204 to the serving base station 108. The request message may include a request for an LBT configuration of one or more neighbor cells. In some embodiments, a specific neighbor cell may be identified. In other embodiments, the request may be a generic request for LBT configurations of neighbor cells in the vicinity of the serving cell 112. In still other embodiments, other parameters may be provided to limit the scope of the sought LBT information. For example, the request may be for a specific frequency layers (or a number of frequency layers) for which the UE 104 is interested in obtaining neighbor-cell LBT configurations.

The request message 204 may be a PRACH message, UCI, a MAC-CE, or an RRC message. The request message 204 may be omitted in some embodiments.

The UE 104 may receive an LBT indication message 208 from the serving base station 108 or an LBT indication message 212 from the neighbor base station 116. The LBT indication message 208/212 may provide an indication of an LBT configuration of the neighbor base station 116. The LBT indication message 208 may be transmitted by dedicated signaling (for example, cell-specific, group-specific, or UE-specific dedicated signaling) or common signaling as described elsewhere herein. The LBT indication message 212 may be transmitted by common signaling as described elsewhere herein.

The UE 104 may receive a reference signal 216 from the neighbor base station 116. The reference signal 216 may be an SSB or channel state information-reference signal (CSI-RS) transmission. In some embodiments, the UE 104 may receive the reference signal 216 based on a measurement object configuration provided by the serving base station 108.

At 220, the UE 104 may measure the reference signal based on the LBT configuration. The measurements of the reference signal may provide the basis for performing an RRM operation such as a neighbor cell search to provide cell reselection from an RRC idle state or a handover from a RRC connected state. In some embodiments, the results of the measurements may be transmitted to serving base station 108.

Figure 3:
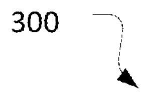
FIG. 3 illustrates an operational flow/algorithmic structure in accordance with some embodiments.
Figure 3:
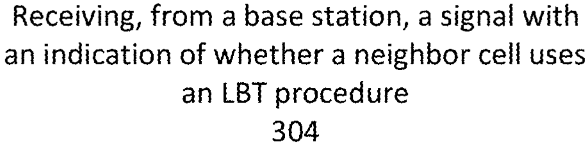

FIG. 3 includes an operation flow/algorithmic structure 300 in accordance with some embodiments. The operation flow/algorithmic structure 300 may be performed or implemented by a device such as, for example, UE 104 or UE 500; or components thereof, for example, processors 504. The operation flow/algorithmic structure 300 may be performed by a UE while the UE is in an RRC connected state, an RRC idle state, or an RRC inactive state.

The operation flow/algorithmic structure 300 may include, at 304, receiving a signal with an indication of whether a neighbor cell uses an LBT procedure. In some embodiments, the signal may be received from a serving cell on which the UE is camped or with which the UE is connected. In other embodiments, the signal may be received from the neighbor cell.

In some embodiments, the signal may be a common signal broadcast to all UEs capable of receiving the signal. For example, the signal may be a broadcast SIB message. In other embodiments, the signal may be a dedicated signal transmitted specifically to one or more UEs (including the UE implementing the operation flow/algorithmic structure 300). The dedicated signal may be a cell-specific specific signal that is for all UEs connected with the serving cell; a group-specific signal for selected group of the UEs connected with the serving cell; or a UE-specific signal that is specifically for the UE implementing the operation flow/algorithmic structure 300. The signal may be a downlink control information (DCI) signal, a PRACH transmission, a MAC-CE, or an RRC signal.

In some embodiments, the signal received at 304 may be a response to a request transmitted by a UE. The requesting UE may be the UE implementing the operation flow/algorithmic structure 300 or may be another UE of the serving cell. The request may be a PRACH transmission, UCI, a MAC-CE, or an RRC transmission.

The operation flow/algorithmic structure 300 may further include, at 308, performing a measurement with respect to the neighbor cell based on whether the neighbor cell uses the LBT procedure. The measurement may be with respect to a reference signal transmitted by the neighbor cell. The requirements used to obtain a measurement from a neighbor cell that uses an LBT procedure may be different from requirements used to obtain a measurement from a neighbor cell that does not use the LBT procedure. For example, a neighbor cell, configured to use the LBT procedure, may intend to transmit a plurality of SSBs but may only be able to transmit a subset of the SSBs due to channel congestion. If a UE is unaware of the possibility of the non-transmission due to channel congestion, the UE may inaccurately determine the channel quality is lower than it actually is by including measurements on the resources associated with the non-transmitted SSBs.

Figure 4:
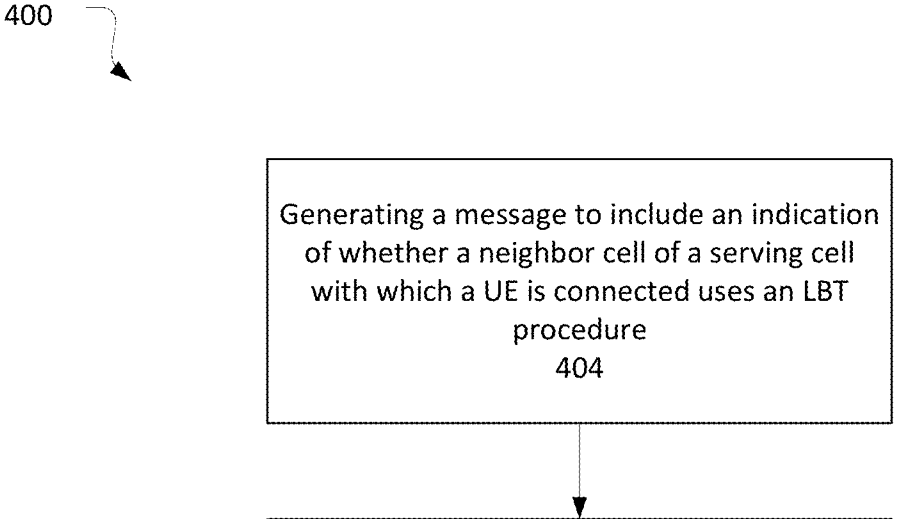
FIG. 4 illustrates another operational flow/algorithmic structure in accordance with some embodiments.

FIG. 4 includes an operation flow/algorithmic structure 400 in accordance with some embodiments. The operation flow/algorithmic structure 400 may be performed or implemented by a device such as, for example, base station 108, 116, or 600; or components thereof, for example, processors 604.

The operation flow/algorithmic structure 400 may include, at 404, generating a message to include an indication of whether a neighbor cell of a serving cell with which a UE is connected uses an LBT procedure. The base station implementing the operation flow/algorithmic structure 400 may be the serving cell of the UE, the neighbor cell whose LBT configuration is indicated in the message, or another neighbor cell.

In some embodiments, the message may be generated as a common signal to be transmitted to all UEs capable of receiving the signal. For example, the message may be a broadcast SIB message. In other embodiments, the message may be generated as a dedicated signal to be transmitted specifically to one or more UEs. The dedicated signal may be a cell-specific specific signal that is for all UEs connected with the serving cell; a group-specific signal for selected group of the UEs connected with the serving cell; or a UE-specific signal that is specifically for one UE. The message may be a downlink control information (DCI) signal, a PRACH transmission, a MAC-CE, or an RRC signal.

In some embodiments, the message with the LBT indication may be generated based on a request received from a UE.

In some embodiments, the indication may be included in a measurement object IE or a serving cell configuration IE. The message may be, for example, a SIB message, an RRC setup message, an RRC reconfiguration message, or an RRC resume message.

The operation flow/algorithmic structure 400 may further include, at 408, transmitting the message to the UE. As discussed above, the message may be transmitted specifically to the UE, to a group of UEs that include the UE, or to all UEs as a broadcast transmission.

Figure 5:
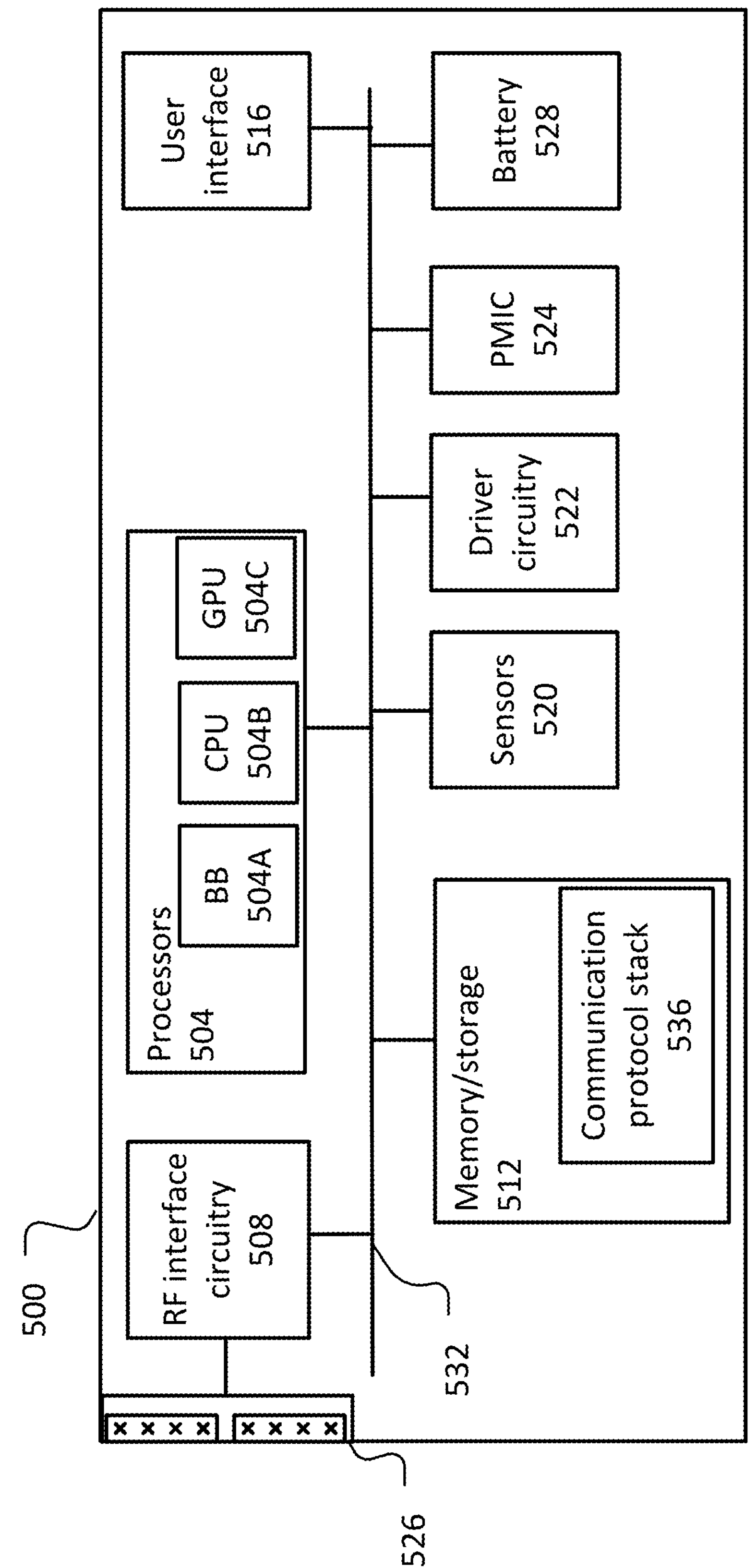
FIG. 5 illustrates a user equipment in accordance with some embodiments.

FIG. 5 illustrates an example UE 500 in accordance with some embodiments. The UE 500 may be any mobile or non-mobile computing device, such as, for example, a mobile phone, a computer, a tablet, an industrial wireless sensor (for example, a microphone, a carbon dioxide sensor, a pressure sensor, a humidity sensor, a thermometer, a motion sensor, an accelerometer, a laser scanner, a fluid level sensor, an inventory sensor, an electric voltage/current meter, or an actuators), a video surveillance/monitoring device (for example, a camera), a wearable device (for example, a smart watch), or an Internet-of-things (IoT) device.

The UE 500 may include processors 504, RF interface circuitry 508, memory/storage 512, user interface 516, sensors 520, driver circuitry 522, power management integrated circuit (PMIC) 524, antenna structure 526, and battery 528. The components of the UE 500 may be implemented as integrated circuits (ICs), portions thereof, discrete electronic devices, or other modules, logic, hardware, software, firmware, or a combination thereof. The block diagram of FIG. 5 is intended to show a high-level view of some of the components of the UE 500. However, some of the components shown may be omitted, additional components may be present, and different arrangement of the components shown may occur in other implementations.

The components of the UE 500 may be coupled with various other components over one or more interconnects 532, which may represent any type of interface, input/output, bus (local, system, or expansion), transmission line, trace, optical connection, etc. that allows various circuit components (on common or different chips or chipsets) to interact with one another.

The processors 504 may include processor circuitry such as, for example, baseband processor circuitry (BB) 504A, central processor unit circuitry (CPU) 504B, and graphics processor unit circuitry (GPU) 504C. The processors 504 may include any type of circuitry or processor circuitry that executes or otherwise operates computer-executable instructions, such as program code, software modules, or functional processes from memory/storage 512 to cause the UE 500 to perform operations as described herein.

In some embodiments, the baseband processor circuitry 504A may access a communication protocol stack 536 in the memory/storage 512 to communicate over a 3GPP compatible network. In general, the baseband processor circuitry 504A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 508.

The baseband processor circuitry 504A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 512 may include one or more non-transitory, computer-readable media that includes instructions (for example, communication protocol stack 536) that may be executed by one or more of the processors 504 to cause the UE 500 to perform various operations described herein. The memory/storage 512 include any type of volatile or non-volatile memory that may be distributed throughout the UE 500. In some embodiments, some of the memory/storage 512 may be located on the processors 504 themselves (for example, L1 and L2 cache), while other memory/storage 512 is external to the processors 504 but accessible thereto via a memory interface. The memory/storage 512 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 508 may include transceiver circuitry and radio frequency front module (RFEM) that allows the UE 500 to communicate with other devices over a radio access network. The RF interface circuitry 508 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 526 and proceed to filter and amplify (with a low-noise amplifier) the signal. The signal may be provided to a receiver of the transceiver that down-converts the RF signal into a baseband signal that is provided to the baseband processor of the processors 504.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna structure 526.

In various embodiments, the RF interface circuitry 508 may be configured to transmit/receive signals in a manner compatible with NR access technologies.

The antenna structure 526 may include antenna elements to convert electrical signals into radio waves to travel through the air and to convert received radio waves into electrical signals. The antenna elements may be arranged into one or more antenna panels. The antenna structure 526 may have antenna panels that are omnidirectional, directional, or a combination thereof to enable beamforming and multiple-input, multiple-output communications. The antenna structure 526 may include microstrip antennas, printed antennas fabricated on the surface of one or more printed circuit boards, patch antennas, phased array antennas, etc. The antenna structure 526 may have one or more panels designed for specific frequency bands including bands in FR1 or FR2.

The user interface 516 includes various input/output (I/O) devices designed to enable user interaction with the UE 500. The user interface 516 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 500.

The sensors 520 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 522 may include software and hardware elements that operate to control particular devices that are embedded in the UE 500, attached to the UE 500, or otherwise communicatively coupled with the UE 500. The driver circuitry 522 may include individual drivers allowing other components to interact with or control various input/output (I/O) devices that may be present within, or connected to, the UE 500. For example, driver circuitry 522 may include a display driver to control and allow access to a display device, a touchscreen driver to control and allow access to a touchscreen interface, sensor drivers to obtain sensor readings of sensors 520 and control and allow access to sensors 520, drivers to obtain actuator positions of electro-mechanic components or control and allow access to the electro-mechanic components, a camera driver to control and allow access to an embedded image capture device, audio drivers to control and allow access to one or more audio devices.

The PMIC 524 may manage power provided to various components of the UE 500. In particular, with respect to the processors 504, the PMIC 524 may control power-source selection, voltage scaling, battery charging, or DC-to-DC conversion.

In some embodiments, the PMIC 524 may control, or otherwise be part of, various power saving mechanisms of the UE 500. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 500 may power down for brief intervals of time and thus save power. If there is no data traffic activity for an extended period of time, then the UE 500 may transition off to an RRC_Idle state, where it disconnects from the network and does not perform operations such as channel quality feedback, handover, etc. The UE 500 goes into a very low power state and it performs paging where again it periodically wakes up to listen to the network and then powers down again. The UE 500 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 528 may power the UE 500, although in some examples the UE 500 may be mounted deployed in a fixed location, and may have a power supply coupled to an electrical grid. The battery 528 may be a lithium ion battery, a metal-air battery, such as a zinc-air battery, an aluminum-air battery, a lithium-air battery, and the like. In some implementations, such as in vehicle-based applications, the battery 528 may be a typical lead-acid automotive battery.

Figure 6:
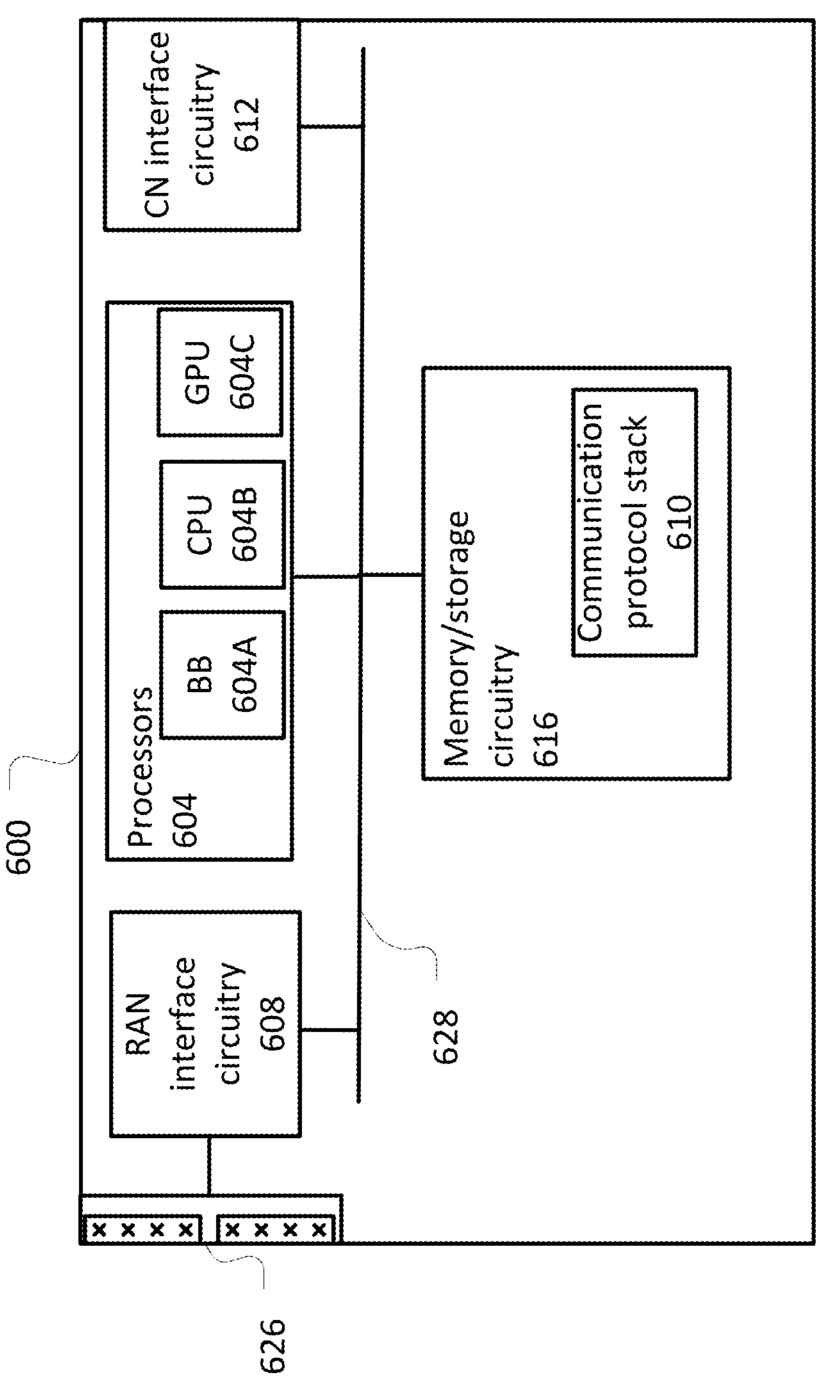
FIG. 6 illustrates a base station in accordance with some embodiments.

FIG. 6 illustrates an example base station 600 in accordance with some embodiments. The base station 600 may include processors 604, RF interface circuitry 608, core network (CN) interface circuitry 612, memory/storage circuitry 616, and antenna structure 626.

The components of the base station 600 may be coupled with various other components over one or more interconnects 628.

The processors 604, RF interface circuitry 608, memory/storage circuitry 616 (including communication protocol stack 610), antenna structure 626, and interconnects 628 may be similar to like-named elements shown and described with respect to FIG. 5.

The CN interface circuitry 612 may provide connectivity to a core network, for example, a $5^{th}$ Generation Core network (5GC) using a 5GC—compatible network interface protocol such as carrier Ethernet protocols, or some other suitable protocol. Network connectivity may be provided to/from the base station 600 via a fiber optic or wireless backhaul. The CN interface circuitry 612 may include one or more dedicated processors or FPGAs to communicate using one or more of the aforementioned protocols. In some implementations, the CN interface circuitry 612 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

EXAMPLES

In the following sections, further exemplary embodiments are provided.

Example 1 includes a method of operating a user equipment (UE), the method comprising: receiving a signal from a base station, the signal to include an indication of whether a neighbor cell uses a listen-before-talk (LBT) procedure;

and performing a measurement with respect to the neighbor cell based on whether the neighbor cell uses the LBT procedure.

Example 2 includes the method of example 1 or some other example herein, further comprising: receiving the signal while in a radio resource control (RRC) connected state, an RRC inactive state, or an RRC idle state.

Example 3 includes the method of example 2 or some other example herein, wherein the signal comprises a system information block (SIB) message.

Example 4 includes the method of example 3 or some other example herein, wherein the base station provides a serving cell with which the UE is associated or the neighbor cell.

Example 5 includes the method of example 1 or some other example herein, wherein the base station provides a serving cell with which the UE is connected and the signal is a dedicated signal.

Example 6 includes the method of example 5 or some other example herein, wherein the dedicated signal is a cell-specific signal for all UEs connected with the serving cell, a group-specific signal for a selected group of UEs, or is a UE-specific signal specifically for the UE.

Example 7 includes the method of example 1 or some other example herein, further comprising: transmitting, to the base station, a request for the indication.

Example 8 includes the method of example 7 or some other example herein, wherein the request is a physical random access channel (PRACH) transmission, uplink control information, a media access control-control element (MAC-CE), or a radio resource control (RRC) transmission.

Example 9 includes a method of operating a base station, the method comprising: generating a message to include an indication of whether a neighbor cell of a serving cell with which a user equipment (UE) is connected uses a listen-before-talk (LBT) procedure; and transmitting the message to the UE.

Example 10 includes the method of example 9 or some other example herein, wherein the base station provides the neighbor cell or the serving cell.

Example 11 includes a method of example 9 or some other example herein, wherein the message is a system information block (SIB) message, a radio resource control (RRC) setup message, an RRC reconfiguration message, or an RRC resume message.

Example 12 includes the method of example 9 or some other example herein, further comprising: transmitting the message via common or dedicated signaling.

Example 13 includes the method of example 9 or some other example herein, wherein the message includes the indication in a measurement object information element (IE) or a serving cell configuration IE.

Example 14 includes the method of example 9 or some other example herein, further comprising: selecting a group of UEs that include the UE based on a device type or UE capability; assigning a radio network temporary identity (RNTI) to the group of UEs; and transmitting the message to the group of UEs using the RNTI.

Example 15 includes the method of example 9 or some other example herein, wherein the indication is a first indication to indicate whether the cell uses the LBT procedure for a first carrier frequency level and the method further comprises: generating the message to include a second indication to indicate whether the cell uses the LBT procedure for a second carrier frequency level.

Example 16 includes the method of example 9 or some other example herein, wherein the indication is a first indication to indicate whether the LBT procedure is used for a first physical cell identifier (PCI) of a carrier frequency level and the method further comprises: generating the message to include a second indication to indicate whether the LBT procedure is used for a second PCI of the carrier frequency level.

Example 17 includes the method of example 9 or some other example herein, further comprising: transmitting the message as part of an early measurement reporting (EMR) configuration in a system information block (SIB) or a radio resource control (RRC) release message.

Example 18 includes the method of example 9 or some other example herein, wherein the message is a first message, the base station is a first base station that provides the serving cell, and the method further comprises: receiving a second message from a second base station that provides the neighbor cell; and determining whether the neighbor cell uses the LBT procedure based on the second message.

Example 19 includes the method of example 18 or some other example herein, further comprising: receiving the second message via an inter-BS interface or a BS-UE interface.

Example 20 includes the method of example 9 or some other example herein, wherein the message is a first message, the UE is a first UE, and the method further comprises: configuring a second UE to report LBT information; receiving, from the second UE, a second message that includes a cell global identity associated with the neighbor cell; and determining whether the neighbor cell uses the LBT procedure based on the second message.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:

receiving a system information block (SIB) in a serving cell, the SIB to include an a first indication of whether a first neighbor cell with a first physical cell identity (PCI) of a frequency level uses a listen-before-talk (LBT) procedure and a second indication to indicate whether the LBT procedure is used for a second PCI of the carrier frequency level; and performing a measurement with respect to the first neighbor cell based on whether the first neighbor cell uses the LBT procedure.

2. The method of claim 1, further comprising:

receiving the SIB while in a radio resource control (RRC) connected state or an RRC idle state.

3. The method of claim 1, further comprising:

transmitting, to the serving cell, a request for the first indication.

4. The method of claim 3, wherein the request is a physical random access channel (PRACH) transmission, uplink control information, a media access control-control element (MAC-CE), or a radio resource control (RRC) transmission.

5. The method of claim 1, wherein the SIB comprises a SIB 3 or SIB 4.

6. The method of claim 1, wherein the first indication applies to a plurality of neighbor cells in the carrier frequency level.

7. The method of claim 1, wherein the serving cell and the first neighbor cell operate in a same carrier frequency.

8. A method comprising:

generating a system information block (SIB) to include a first indication of whether a first neighbor cell of a serving cell with which a user equipment (UE) is connected uses a listen-before-talk (LBT) procedure and a second indication of whether a second neighbor cell uses the LBT procedure, wherein the first neighbor cell has a first physical cell identity (PCI) of a carrier frequency level and the second neighbor cell has a second PCI of the carrier frequency level; and outputting the SIB for transmission to the UE in the serving cell.

9. The method of claim 8, wherein the SIB includes the first indication in a measurement object information element (IE).

10. The method of claim 8, wherein the SIB is in a message, carrier frequency level is a first carrier frequency level and the method further comprises:

generating the message to include a third indication to indicate whether the first neighbor cell uses the LBT procedure for a second carrier frequency level.

11. The method of claim 8, wherein the SIB comprises a SIB 3 or SIB 4.

12. An apparatus comprising:

a radio-frequency (RF) interface; and processing circuitry coupled with the RF interface, the processing circuitry to:

configure a first user equipment (UE) to report listen-before-talk (LBT) information;

receive, from the first UE, a message that includes a cell global identity associated with a neighbor cell; and determine, based on the message, whether a neighbor cell of a serving cell with which a second UE is connected uses an LBT procedure;

generate a system information block (SIB) to include an indication of whether the neighbor cell the LBT procedure; and output, via the RF interface, the SIB for transmission to the second UE in the serving cell.

13. The apparatus of claim 12, wherein the SIB includes the indication in a measurement object information element (IE).

14. The apparatus of claim 12, wherein the message is a first message, the SIB is in a second message, the indication is a first indication to indicate whether the neighbor cell uses the LBT procedure for a first carrier frequency level and the processing circuitry is further to:

generate the second message to include a second indication to indicate whether the neighbor cell uses the LBT procedure for a second carrier frequency level.

15. The apparatus of claim 12, wherein the message is a first message, the SIB is in a second message, the indication is a first indication to indicate whether the LBT procedure is used for a first physical cell identifier (PCI) of a carrier frequency level, and the processing circuitry is further to:

generate the message to include a second indication to indicate whether the LBT procedure is used for a second PCI of the carrier frequency level.

16. The apparatus of claim 12, wherein the SIB comprises a SIB 3 or SIB 4.

* * * * *